United States Patent [19]

Chan

[11] Patent Number: 4,570,216
[45] Date of Patent: Feb. 11, 1986

[54] PROGRAMMABLE SWITCH

[75] Inventor: Peter Chan, Tsuen Wan N.T., Hong Kong

[73] Assignee: Brightmond Company Limited, Hong Kong, Hong Kong

[21] Appl. No.: 465,061

[22] Filed: Feb. 10, 1983

[51] Int. Cl.⁴ .................... H01H 3/34; H01H 3/26; G05B 15/00

[52] U.S. Cl. ................... 364/143; 364/144; 364/145; 364/147; 364/141; 340/309.15; 340/309.5; 307/140; 307/141; 307/141.4; 307/141.8

[58] Field of Search ............... 364/143, 144, 145, 147, 364/141; 340/309.15, 309.5; 307/140, 141, 141.4, 141.8, 132 E, 116; 315/360; 323/905

[56] References Cited

U.S. PATENT DOCUMENTS 3,335,318  8/1967  Yaucey .................... 323/905
4,165,532  8/1979  Kendall et al. .............. 307/141.4 X
4,176,395  11/1979  Evelyn-Veere et al. ....... 364/146 X
4,279,012  7/1981  Beckedorff et al. ........... 364/145 X
4,354,120  10/1982  Schornack ................... 307/141 X

OTHER PUBLICATIONS

Simplex "Master Time System and Remote Modules" 1980.

"Autoswitch Precise Time Control" Rothenbuhler Engineering 1981.
"The Art of Electronics" Horowitz et al., 1980 Cambridge University Press.
"Paragon EC 700 Programmable Time Controller" AMF Paragon 1979.

*Primary Examiner*—Jerry Smith
*Assistant Examiner*—Charles B. Meyer
*Attorney, Agent, or Firm*—Townsend and Townsend

[57] ABSTRACT

A fully automatic programmable wall switch timer for controlling lighting circuits is described. The device provides user selected lighting circuit operation at predetermined event times, for predetermined event duration at said times, and at a selected light brightness or intensity level. The device is microprocessor controlled and is intended for installation in a standard wall switch box using existing wall switch plates. Included are a time of day and programming display and a three-way switch option. Separate switches are provided for isolating the unit from the power line, selecting lighting circuit operation, and advancing the display time. Additionally, various user programming modes are provided by operation of said switches singly and in conjunction with each other.

19 Claims, 3 Drawing Figures

Microfiche Appendix Included
(1 Microfiche, 44 Pages)

PROGRAMMABLE SWITCH

This document includes a Microfiche Appendix including 1 fiche having a total of 44 frames.

BACKGROUND OF THE INVENTION

1. Field of the Invention

The present invention relates to a device for controlling electrical lighting circuits. More particularly, the present invention provides a lighting control device that may be user programmed to operate associated lights at predetermined times and for predetermined intervals.

2. Description of the Prior Art

The incidence of property loss due to breakins in private residences is increasing at an appalling rate. Yet it is often the resident's routine that unintentionally provides encouragement to house-breakers. It safely can be assumed that a house-breaker would prefer to find no one home when he makes his call. In this way, there is no one to defend the homestead or to call the police. House-breakers watch for indications that no one is at home. For example, newspapers piling up at the door-step indicate that the resident is out of town. By watching a house in the evening, the house-breaker can determine if the resident is at home by making note of activity within the home, as indicated by the presence of sounds or, more particularly, by the operation of lights.

Residents may often discourage house-breakers, and thereby protect their possessions when they are away from home, by providing a lighting use pattern at the residence which gives the residence a "lived-in" appearance. One such way of controlling residential lighting when no one is home is to provide a timer switch in series with the lighting circuit. Most of such devices that are commercially available plug into a wall outlet and provide a receptacle into which a table or floor lamp is plugged. The device is typically operated by an electric motor which drives a clock mechanism. The mechanism provides various settings whereby the clock movement opens and closes a switch to control the light plugged into the timer receptacle.

Such timers provide limited control of the lighting circuit. That is, the number of events (number of times the lights associated therewith may be operated) are usually few. The limited number of events provide a less convincing illusion of residency to a prospective house-breaker. For example, turning a light on at 7:00 P.M. and turning the same light off at 10:00 P.M. every night presents a mechanical appearance of light use within the residence and may not persuade the house-breaker to avoid the residence. It would be more convincing to provide a series of lighting events during a typical evening, indicating activity within.

Such timers as are commonly available generally draw a small amount of current which, over a long period of time, adds up to a significant operating cost. Such timers may often require the use of extension cords and other such wiring which is unsightly and which also presents a shock or fire hazard. Because such devices look "out of place", a casual visitor (such as a delivery man) may notice that such devices are in use and may be tempted to make a pick-up when no one is at home. Additionally, such devices are unsightly and take up counter or table space.

Such timing devices are useful only for table or floor lamps. The devices cannot be used for lighting controlled by a wall switch, such as ceiling or fixture lighting. Such timing devices are particularly useless for nonsecurity applications, such as safety lighting. For example, a hall light on a three-way lighting switch cannot be controlled by such devices. Yet it is desirable to provide lighting in a hallway during those hours when the hallway is darkened and yet may occasionally be used.

SUMMARY OF THE INVENTION

The present invention provides a fully automatic programmable light switch timer for controlling lighting circuits. The invention includes a built-in digital clock and, in a preferred embodiment, is readily installed in a standard wall switch box thereby avoiding dangerous and unsightly extension cords. Different embodiments of the invention provide for replacing an existing wall switch of a single pole or three-way switch type, operating an appliance, and controlling a table lamp with a stand-alone unit.

The device is programmable to control the lighting circuit over a 24-hour cycle wherein various on/off intervals of selected duration are provided. Programming is readily accomplished and may be modified, reviewed, or disabled by a user. Additionally, the lighting circuit may be operated in a manual mode without disturbing an existing user program.

The device is mounted in a standard wall box in place of an existing single pole or three-way switch. In this way, the device does not intrude into the home by taking up space with an unsightly mechanism, nor is any clue given to casual visitors as to the security nature of the device. A fused master on/off switch is provided for isolating the power line if desired. Power is provided from the line through said switch to a device power supply, by which various solid state circuits within the device are operated. Solid state circuitry, as is well known, consumes less energy during operation than conventional electromechanical devices. One feature of the present invention is that although it, of necessity, is usually running, it draws very little current.

Programming of device operation is controlled by two or more pushbutton switches. A microprocessor receives such control signals and, in accordance therewith, operates an electronic switch. The electronic switch controls the lighting circuit load in accordance with user instructions provided to the microprocessor. One embodiment of the invention provides a light dimming function, in addition to on/off light circuit control. Microprocessor timing is controlled by a crystal clock circuit.

The present invention also has a display circuit, under microprocessor control, which indicates current time, program time (as selected), and light operation.

The present invention provides a safe and unobtrusive multi-event timer for controlling a lighting circuit. The device is readily interchangeable with an existing wall light switch and is therefore useful as a security device, safety device, and as a convenient lighting circuit control device. By providing a manual and a program mode of operation the present invention allows a user unlimited flexibility and permits the device to be put to many uses.

DETAILED DESCRIPTION OF A PREFERRED EMBODIMENT

The present invention provides a programmable switch which may be used to replace an existing wall switch in a lighting circuit. The switch is user programmable to control an electric light circuit through a series of predetermined events during a 24-hour cycle. User operation of the present invention includes both manual and program control of lights and lighting levels. A four-digit, seven-segment display provides time and programming information to the user.

Figure 1:
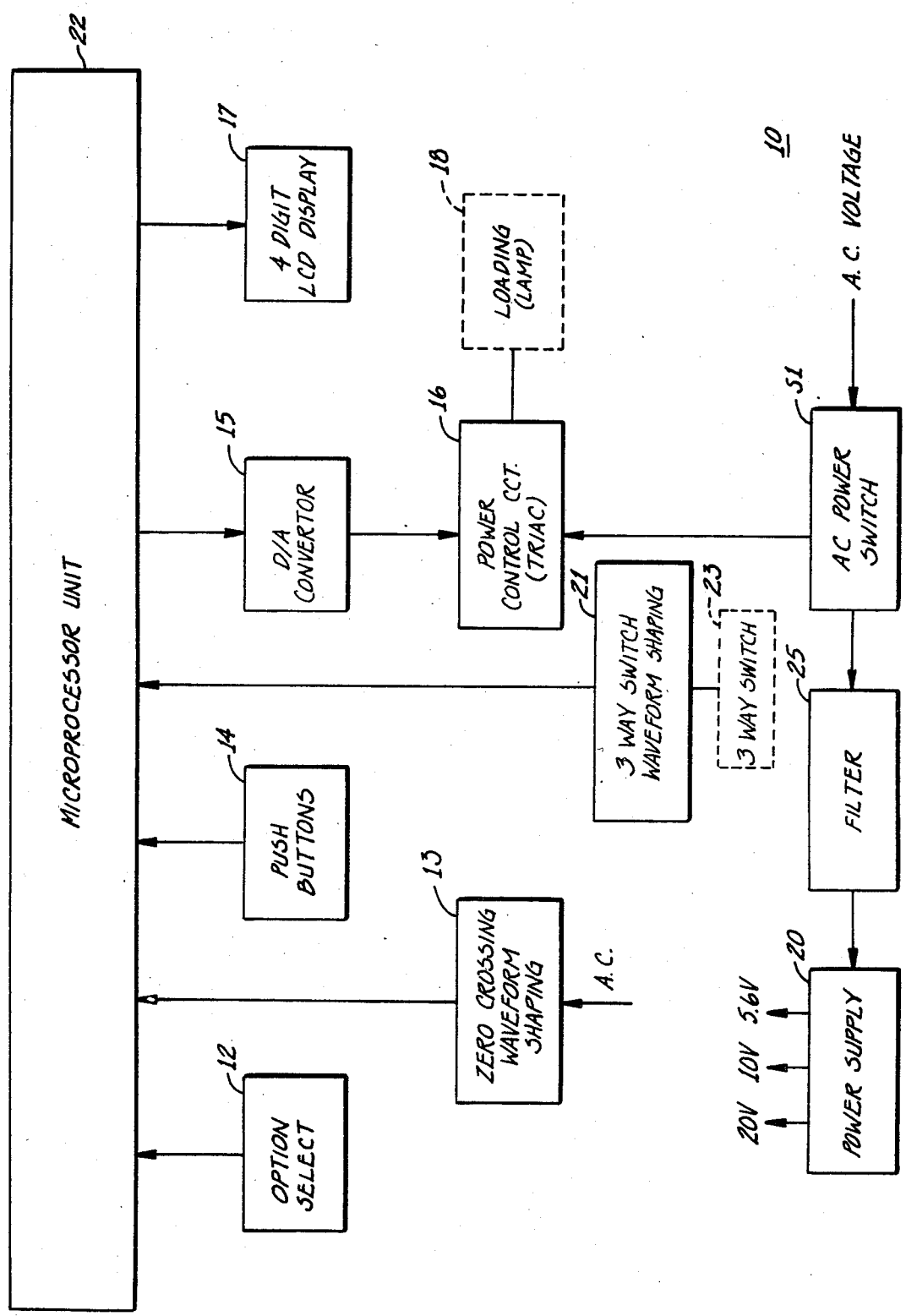
FIG. 1 is a block diagram of a programmable light switch according to the present invention.

A block diagram of the programmable light switch invention, designated generally with the reference numeral 10, is shown in FIG. 1. The programmable light switch 10 is coupled to an AC voltage source through an AC power switch S1. An inductive filter 25 provides AC voltage to a power supply 20. The power supply provides DC output voltages as are required for the particular embodiment of the invention. In FIG. 1, the power supply is shown producing a 5.6 volt, 10 volt, and 20 volt DC output.

AC voltages also provided to a power control circuit 16 by which a lighting circuit load, such as a lamp 18, is operated. Power control circuit 16 operation (and, in turn, lamp 18 operation) is controlled by a microprocessor unit 22.

Microprocessor unit 22 operates in accordance with an internal instruction set. User instructions are entered into a user memory space of the microprocessor unit by operation of pushbuttons 14. A four digit LCD display 17 provides indication of programmable switch operation and may also provide a time of day indication.

In one embodiment of the invention, a D/A converter 15 is provided by which the duty cycle of power control circuit 16 is selectably varied. Lamp 18 is brightened or dimmed as desired in accordance therewith.

A zero crossing waveform shaping circuit 13 is provided such that firing of the power control circuit triac is accomplished in a correct manner. Various options may be chosen by option select circuit 12. These options include 50 Hz/60 Hz operation, circuit operation of an appliance instead of a lighting circuit, etc. Additionally, a three-way switch 23 may be coupled to a three-way switch waveform shaping circuit 21, which produces an appropriate output signal that is coupled to the microprocessor unit 22. In this way, the present invention may be used in a three-way lighting circuit without modification to the lighting circuit or to the invention.

Figure 2:
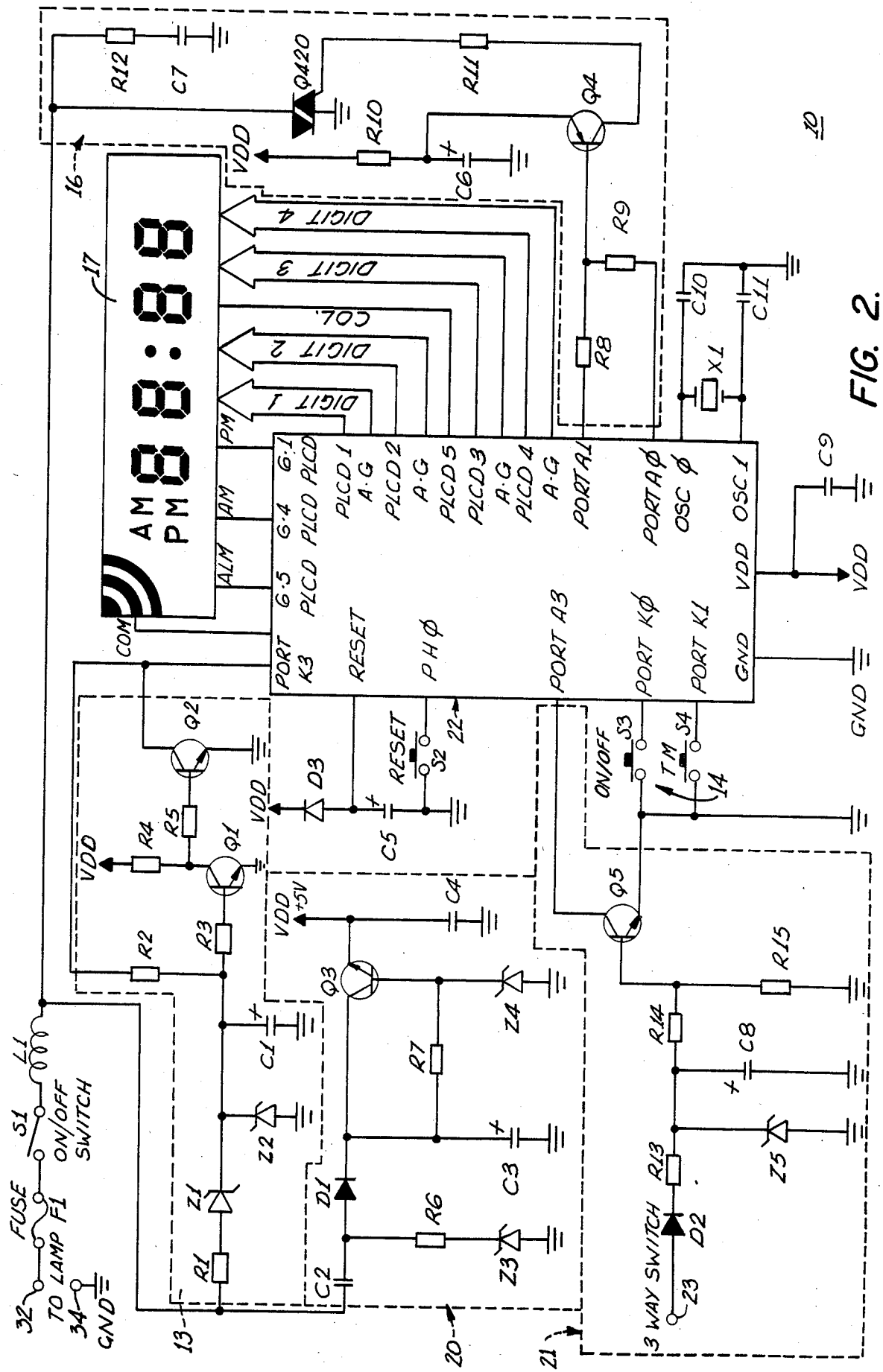
FIG. 2 is a schematic diagram of a first exemplary embodiment of the present invention.

A schematic diagram, showing a first exemplary embodiment of the programmable switch invention 10 in greater detail, is shown in FIG. 2. As can be seen, the programmable switch 10 is coupled to a lighting control circuit via terminals 32/34, in place of a standard single-pole single-throw wall switch. AC current is provided through a fuse F1, a master on/off switch S1, and a filter inductor L1 to the various circuits of the invention. Fuse F1 is provided as a safety feature to prevent damage to the circuit in the event an excessive current is drawn. On/off switch S1 is provided to isolate the circuit from the AC power source as desired.

Current from inductor L1 is provided through a power supply circuit 20 which includes a coupling capacitor C2, a half-wave rectifier D1, and a filter capacitor C3. Voltage regulation is provided by zener diodes Z3/Z4, resistors R6/R7, and a transistor Q3. A capacitor C4 is provided to filter the output of transistor Q3 (VDD).

Lighting control in the present invention is accomplished by a microprocessor 22, such as the MSM58421GS (OK1421) CMOS single component microcomputer, manufactured by OKI Semiconductor, Inc. of Santa Clara, Calif. Power is supplied to microprocessor 22 at terminal VDD; a capacitor C9 is included to filter power at the microprocessor. Microprocessor timing is controlled by a crystal X1 and capacitors C10/C11, which components are coupled to microprocessor 22 at terminals OSCO/OSC1.

A display 17 is coupled to microprocessor 22 to indicate time, programming information, and light operation. In this first embodiment of the invention, the display is a four-digit, seven-segment liquid crystal display and includes an AM/PM indicator, a colon, and a light operation indicator. In the present embodiment of the invention, the light operation indicator is a series of semi-circles located at the upper left-hand corner of the display.

In addition to master on/off switch S1, the present invention provides a series of pushbuttons 14, including a reset switch (RESET) S2, a lamp on/off switch (ON/OFF) S3, and a time set switch (TM) S4. Reset switch S2 is coupled to terminals RESET and PHO of microprocessor 22. When closed, switch S2 operates in conjunction with the capacitors C5 and a diode D3 to provide a reset pulse at the RESET terminal of microprocessor 22. Microprocessor 22 has an internal memory wherein user and control programs are stored. A listing of a control program for microprocessor 22 is included as a Microfiche Appendix to this document. Operating reset switch S2 clears user programs from the memory and resets the time display. Reset may also be accomplished by opening and closing master on/off switch S1.

On/off switch S3 is connected to microprocessor 22 at PORT K0. Switch S3 is of a momentary-contact push-button type. Closing switch S3 causes microprocessor 22 to toggle an internal latch and change the state of the lighting circuit. That is, if the lights are on, pressing switch S3 turns the lights off and vice-versa.

Time set switch S4 is a momentary-contact push-button type switch and is used to set the display time and to program the lighting control event times. Circuit operation in programming and time set modes is determined by pressing switches S3 and S4 singly and in combination to step the circuit through the various operation modes, as discussed below.

When a control event occurs, such as manual or program on/off control, a signal is produced at the PORT A1 or PORT A0 terminals of microprocessor 22 and coupled to a solid-state control circuit 16. The signals are coupled through resistors R8 and R9 respectively to the base of transistor Q4. When the signals are present at the base of Q4, a voltage across a capacitor C6 couples the DC voltage source VDD through a resistor R10 to the emitter of transistor Q4. When in this state, transistor Q4 conducts and a current flows through a resistor R11 to triac Q420. Line voltage is coupled to ground through triac Q420 and the lighting circuit is energized. A resistor R12 and a capacitor C7 are provided to damp line transients and thereby protect triac Q420.

Proper firing of triac Q420 is maintained by zero crossing waveform shaping circuit 13. The AC line voltage which the triac controls is also coupled through a resistor R1 and a zener diode Z1 to an integrating capacitor C1. A zener diode Z2 allows capacitor C1 to charge to a reference level. The charge integrated by capacitor C1 is coupled to the base of a transistor Q1 by a resistor R3.

The collector of transistor Q1 is coupled to DC voltage source VDD through a resistor R4 and is also coupled to the base of a transistor Q2 through a resistor R5. A resistor R2 is coupled from the collector of transistor Q2 to establish a feedback path. The collector of transistor Q2 is also coupled to PORT K3 of microprocessor 22.

Transistor Q1 operates as a switch to control transistor Q2. Operation of transistor Q2, in turn, provides an interrupt signal at PORT K3 (by connecting the port between a high condition and a ground condition). An interrupt sensed at PORT K3 by microprocessor 22 indicates an AC voltage zero crossing condition such that triac operation may be properly coordinated with the alternating current lighting circuit.

To deenergize the lighting circuit, the signal is removed from PORT A1/A0 of microprocessor 22, turning off transistor Q4, and thereby turning off triac Q420. This condition removes the connection between terminal 32 and ground to deenergize the lighting circuit.

It is contemplated with the present invention will find application as a security device and also as a safety device. Certain such installations where the present invention would be used as a safety device would be in hallways which would be dangerous if unlit. Typically, such hallways include a light switch at each end, whether it be a long narrow hallway or a stairway where the light is employed. To accomplish such lighting, a three-wire lighting circuit is used. Such circuits are well known in the electrical art and need not be fully described here. To accommodate such wiring circuits, the present invention provides a three-way switch terminal 23 to which a third wire in the lighting circuit is coupled through a sense circuit 21 to PORT A3 of microprocessor 22. The sense circuit provides a pulse at PORT A3 whenever a light switch in the circuit remote from the location of the present invention is operated. A change of state at terminal 23 is detected by a diode D2 and coupled to the base of the transistor Q5 through a filter and bias circuit comprising resistors R13-R15, a capacitor C8, and a zener diode Z5. A pulse presented to the base of transistor Q5 causes the transistor to conduct and couples PORT A3 of microprocessor 22, which is tied to the collector of transistor Q5, to ground via the emitter of transistor Q5. In this way, the internal circuitry of microprocessor 25 toggles the control circuit and thereby reverses the control signals at the PORT A1 and PORT A0 terminals.

Three-way lighting circuit operation is as follows. If the lights are off and the remote switch is actuated to turn the lights on, the condition is sensed by sense circuit 21 and the lights are turned on. If the lights are already on and it is desired to turn them off with the remote switch, the remote switch is actuated and the condition is sensed by sense circuit 21, which signals the microprocessor to turn off the lights.

In operation, switch S1 isolates power from the device. When the switch is in the on position, the lighting circuit is controlled by the device. Turning off switch S1 clears the microprocessor's internal memory circuit and erases any preprogrammed schedule.

Push button switch S4 is used for setting up clock timing settings in conjunction with pushbutton switch S3. Push button switch S3 is used for manual control of the lighting circuit and is also used for clock and timer setting in conjunction with switch S4.

Operation of four digit display 17 is as follows: Display 17 flashes when the device is just switched on and stops flashing when the clock is set (see below.) The display colon segment (controlled by the line COL.) is turned off when the user operates the device program review feature, as described below. The display colon segment is flashing when programming is completed and the device is running. When the program is disabled (see below), the colon remains on. The present invention also provides for an inherent programming mode wherein the colon is flashing at dual speeds.

When the power is switched off, the display is also off. The time of day is indicated by the AM/PM portion of display 17 (as controlled by the AM/PM lines). When the lights are on, the semi-circle symbol in the upper left hand corner of the display is present (as controlled by the ALM line). The symbol is absent when the lights are off.

Figure 3:
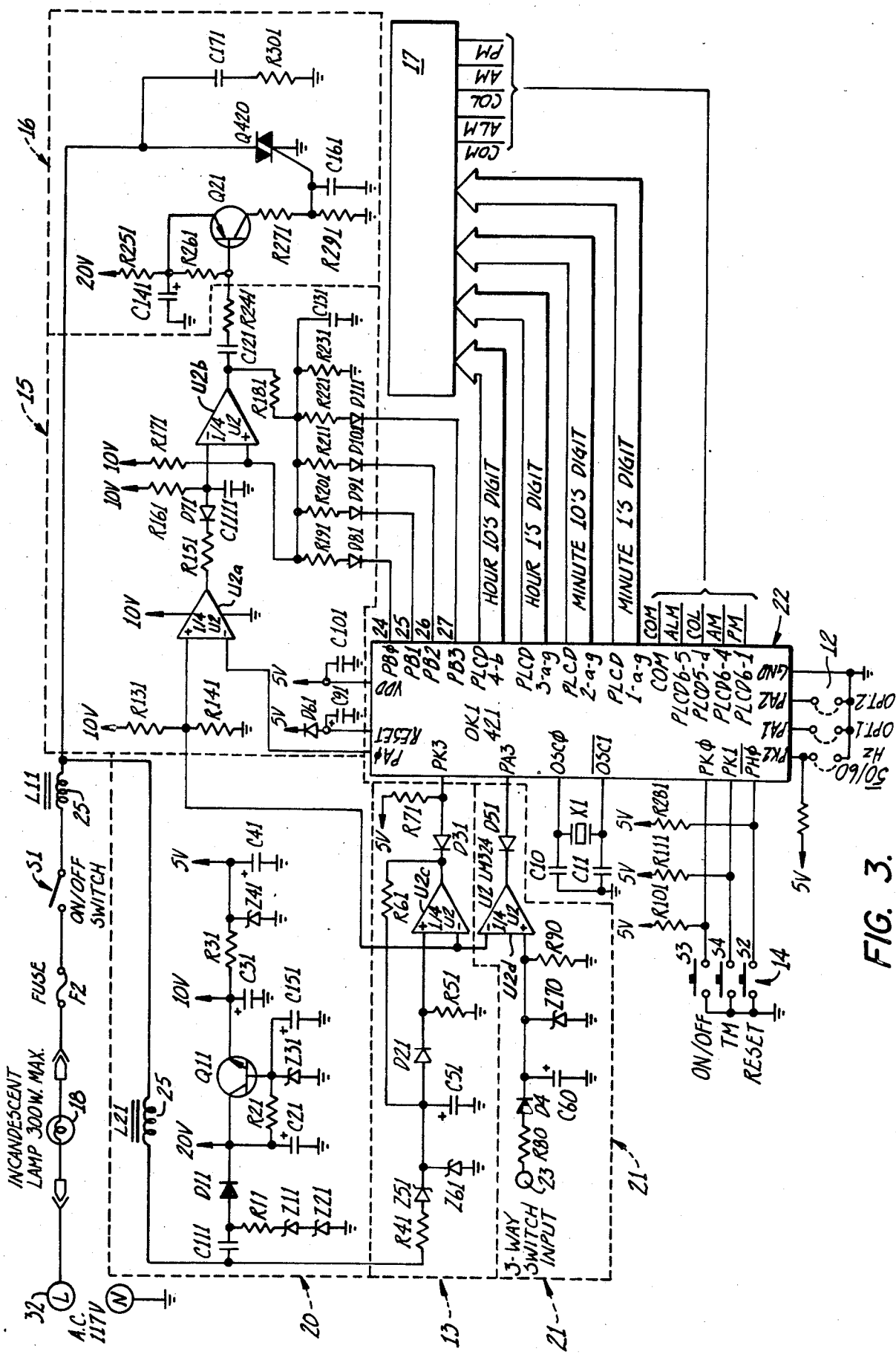
FIG. 3 is a schematic diagram of a second exemplary embodiment of the present invention.

A schematic diagram of a second exemplary embodiment of the present invention is shown in FIG. 3. The embodiment shown provides a digital-to-analog conversion circuit 15 by which a lighting load connected to a lighting circuit may be dimmed. The embodiment of FIG. 3 additionally provides an option select circuit 12. Because many of the functions provided in the second exemplary embodiment of the invention operate in a manner similar to those of the first exemplary embodiment, the description of FIG. 3 is limited to those aspects of the embodiment which are different in operation or which provide different features.

It should be noted that a quad-comparator U2 (including comparators U2a-U2d) is provided in three-way switch circuit 21, zero crossing circuit 13, and in the digital-to-analog conversion circuit 15. The use of a multifunction integrated circuit reduces the number of discrete components required to make the present invention and thereby reduces cost while facilitating manufacture. By including option select circuit 12 the following additional features are provided: 50Hz/60Hz operation, appliance operation, and lighting load dimming.

D/A converter circuit 15 provides the load dimming feature described above. Microprocessor 22 provides a D/A reset signal through port PA0 during each half cycle of the AC current duty cycle. The reset signal from the microprocessor is coupled to the inverting input of reset comparator U2a. The noninverting input of the comparator U2a is coupled to the DC power source (10V) through a voltage divider circuit consisting of resistors R131/141.

The reset signal output from comparator U2a is coupled through a resistor R151 and a diode D71 to an integrating capacitor C1111. When a reset signal is produced by comparator U2a, diode D71 is reverse biased and a voltage is dropped through a resistor R161 and integrated by capacitor C1111.

The charge on capacitor C1111 continually increases as a function of time as long as comparator U2-a is in a reset mode, as controlled by microprocessor 22. The charge on capacitor C1111 is sensed at the inverting input of a D/A comparator U2b.

The noninverting input of D/A comparator U2b is coupled to a selectable reference voltage. Ports PB0-PB3 of processor 22 may be selectably operated to forward bias diodes D81, D91, D101, and D111 singly and in combination. Forward biasing one of said diodes couples a voltage from the power source through a resistor R171, which makes one half of a voltage divider circuit. The other half of the voltage divider circuit is the resistor associated with the forward biased diode: that is, diode D81/resistor R191; diode D91/resistor R201; diode D101/resistor R211; and diode D111/resistor R221. The value of said resistors increases in a step ladder fashion to provide a greater voltage drop and thereby a large reference voltage at the noninverting input of D/A comparator U2b. A resistor R231 is included to provide a minimal reference level. A capacitor C13 is included to couple transients and spikes to ground. Additionally, a resistor R181 is included to provide a feedback path for comparator U2b.

In operation, capacitor C1111 integrates a charge over a period of time until the integrated charge present at the inverting input of the D/A comparator U2b equals the reference voltage level present at the noninverting input of the comparator. The larger the reference level provided at the noninverting input of the comparator, the longer it takes to integrate an equal charge. Once the integrated charge equals the reference level, the comparator changes state. An output is produced by comparator U2b which is coupled through a capacitor C121 and a resistor R241 to the base of a transistor Q21. Transistor Q21 controls operation of the triac. When the comparator changes state, the transistor is turned off. Depending on the selected reference voltage present at the noninverting input of the D/A comparator, the duty cycle or operational interval of transistor Q21 is either greater or lesser. Accordingly, the power provided to lamp 18 is either greater or lesser and dimming of the lamp is thereby accomplished.

The present invention operates in two mutually inclusive manners: (1) automatic or programmed operation, and (2) manual operation. The device must be programmed to provide automatic operation. Programming may be implemented in two ways: (1) inherent programming and (2) advance programming.

Inherent programming starts with a program cleared condition, i.e., power is removed. When power is restored, AM 12:00 is displayed. Switch S4 is first depressed to advance the clock display time. If switch S4 is held closed, the time value is automatically incremented at a quick rate; if the switch is pressed and released immediately, the time displayed is advanced by one minute. Once the correct time is displayed, the time is entered by closing switch S3 once, at which point the display stops flashing and the clock begins keeping time.

At this point the lighting circuit may be operated by opening and closing switch S3 once for each change of state in the lighting circuit. In the inherent programming mode, the device tracks operation of the lighting circuit throughout an initial 24-hour period. In this way, a normal use pattern during a day of operation is memorized by the switch and is thereafter repeated until altered by a user.

In the advance programming mode, the clock display circuit is set up as for inherent programming. Once the correct time is displayed, switch S4 is quickly closed and opened twice. The colon in the display goes off and the device is in programming mode. Switch S3 is depressed and held so that the lighting circuit is placed in the desired condition (lights on or off). Switch S4 is then pressed and held until the desired event time is reached. This process is repeated until the event times for an entire 24-hour period are programmed into the device. The programming mode may be exited by closing switch S4 twice in rapid succession.

The user program may be inhibited by simultaneously closing switch S3 and S4 and holding said switches closed for a one second time period. In this mode the display colon stays on, indicating the program is inhibited. To enable the program again, the same step is repeated.

The present invention also provides a program review mode that is entered by closing switch S4 twice. In this mode, switch S4 may be held or continually closed in advance the program time. The semi-circular symbol on the display is present when the lighting circuit is activated during program execution. This mode may be exited by allowing a 24-hour period to pass or by quickly operating switch S4 twice. The program may also be modified while in the review mode. To do so, switch S3 is pressed and held when a desired event time is selected by operation of switch S4.

During normal operation of the device, the programming may be contradicted by operation of switch S3, which provides for a manual mode of switch operation. Additionally, the lights may be toggled by operation of a remote switch in a three-way switch installation.

Finally, the invention may be operated in a bright-/dim mode wherein a lighting load connected to the lighting circuit may be dimmed. To set the desired lighting level during either of the programming modes or during manual operation, the ON/OFF switch is held closed. When a desired light level is achieved, the switch is then released.

Although particular embodiments of the invention have herein been described it will be appreciated that various equivalent embodiments of the invention are possible. For example, the device could be made in a self-contained version so that it could be used to operate table lamps. Additionally, the present invention could be adapted to operate appliances other than lights. Accordingly, the scope of the invention should be limited only by the breadth of the claims.

What is claimed is:

1. A programmable electrical switch providing a plurality of user selected switch events at selected times and of selected duration, comprising:

a processor for storing instructions corresponding to said user selected switch events and for generating switch control signals at selected times and of selected duration in accordance therewith, the switch control signals including a reset signal and a plurality of selection signals;

circuit means operable in response to the switch control signals to produce an on/off signal, the circuit means including first means for producing a time varying voltage in response to receipt of the reset signal, second means for selectively producing a voltage level in response to the selection signals, and voltage comparing means for receiving and comparing the time-varying voltage and the one voltage level to produce therefrom the on/off signal in the form of a digital waveform signal; and a solid-state switch, coupled to said circuit means, for controlling the on/off state of and the power level supplied to a switch load in response to said on/off signal.

2. The programmable switch of claim 1, further comprising:
means, coupled to said processor, for sensing a remote switch operation and for generating a toggle signal, wherein said processor responds to said toggle signal by generating the switch control signals to effect change of the on/off state of said solid-state switch load.

3. The programmable switch of claim 2, further comprising:
means for setting programmable switch operation, wherein said solid-state switch may be operated in accordance with said stored instructions and wherein said solid-state switch may alternately be operated manually in response to user control.

4. The programmable switch of claim 1, including means, coupled to the processor, for entering said instructions into the processor.

5. The programmable switch of claim 4, further comprising:
means, coupled to said processor, for displaying entry of said instructions into said processor, said user selected switch events, and time of day.

6. The programmable switch of claim 5, further comprising means for resetting said processor.

7. The programmable switch of claim 1, the circuit means including means operable to selectively vary the duty cycle of the digital waveform signal in response to the switch control signals.

8. A multi-event lighting circuit timer for selectively controlling an AC current flow in a lighting circuit, comprising:
a processor for receiving and storing user instructions corresponding to selected event times and selected event durations, and for generating a control signal output in accordance therewith;
a solid-state switch, including a triac, coupled to said processor, for controlling the on/off state of said lighting circuit in response to receipt of said control signal output by the triac;
switch means, coupled to said processor, for entering user instructions into said processor; and
zero crossing detection means coupled to the processor and to a source of the AC current for varying the control signal to coordinate operation of the triac with the AC current flow in the lighting circuit.

9. The timer of claim 8, said switch means further comprising a plurality of momentary-contact pushbutton switches.

10. The timer of claim 9, further comprising means for isolating said timer from a timer power source.

11. The timer of claim 8, further comprising:
means, coupled to said processor, for sensing operation of a remote switch in a 3-way lighting circuit and generating therefrom a toggle signal, wherein said processor responds to said toggle signal by modifying the control signal output to cause said solid-state switch to change the on/off state of said lighting circuit.

12. The timer of claim 11, further comprising:
means, coupled to said processor, for setting processor operation wherein said timer may be operated in accordance with said stored instructions and wherein said timer may alternately be operated manually in response to direct user control.

13. The timer of claim 12, further comprising means for resetting said processor.

14. The timer of claim 8, further comprising means, under processor control, for selectably adjusting a lighting circuit power level supplied to a lighting circuit load.

15. The timer of claim 14, said adjusting means further comprising:
a comparator including a first input for integrating a comparator reset signal, a second input for comparing said reset signal with a selected reference level signal, and an output providing an output signal for controlling the duty cycle of said triac in accordance with an integration interval determined by said reference level signal.

16. The timer of claim 8, wherein said timer is adapted to be mounted in a wall switch box.

17. The timer of claim 8, including a display, coupled to the processor, for selectively indicating received user instructions, stored user instructions, and lighting circuit on/off state.

18. The timer of claim 17, the display further comprising a four-digit, seven-segment liquid crystal display which additionally indicates time of day.

19. A multi-event lighting circuit timer, comprising:
a processor for receiving and storing user instructions corresponding to selected event times and selected event durations, and for generating a control signal in accordance therewith;
switch means, coupled to the processor, for entering the user instructions into the processor;
a display, coupled to said processor, for selectively indicating received user instructions, stored user instructions, and lighting circuit on/off state;
a solid-state switch, coupled to the processor, for controlling the on/off state of a lighting circuit in response to the control signal; and
circuit means, coupled to the processor and under processor control, for selectively adjusting a lighting circuit power level supplied to the lighting circuit, the circuit means including a comparator having a first input for integrating a reset signal, a second input for comparing the integrated reset signal with a selected reference level signal, and an output providing an output signal for controlling the duty cycle of the solid-state switch in accordance with an integration interval determined by the reference level signal.

* * * * *